United States Patent [19]

Stapleton

[11] Patent Number: 5,573,161
[45] Date of Patent: Nov. 12, 1996

[54] ARTICLE CARRIER CROSSBAR WITH SPLIT STANCHION CLAMP

[76] Inventor: Craig A. Stapleton, 995 Muer St., Troy, Mich. 48084

[21] Appl. No.: 362,277

[22] Filed: Dec. 22, 1994

[51] Int. Cl.⁶ .................................................. B60R 9/045
[52] U.S. Cl. .......................... 224/321; 224/322; 224/309; 403/DIG. 9
[58] Field of Search .................................. 224/309, 315, 224/319, 321, 322, 323, 325, 331; 248/316.4, 316.5; 403/22, DIG. 9

[56] References Cited

U.S. PATENT DOCUMENTS

| | | |
|---|---|---|
| 4,162,755 | 7/1979 | Bott . |
| 4,270,681 | 6/1981 | Ingram . |
| 4,274,570 | 6/1981 | Bott . |
| 4,323,182 | 4/1982 | Bott ........................................ 224/321 |
| 4,487,348 | 12/1984 | Mareydt . |
| 4,673,119 | 6/1987 | Bott ........................................ 224/309 |
| 4,858,803 | 8/1989 | Gerber ..................................... 224/309 |
| 5,007,570 | 4/1991 | Himmel ..................................... 224/321 |
| 5,205,453 | 4/1993 | Pudney et al. . |
| 5,232,138 | 8/1993 | Cucheran . |
| 5,275,320 | 1/1994 | Duemmler .................................. 224/321 |
| 5,302,039 | 4/1994 | Omholt .................................. 403/DIG. 9 |
| 5,314,104 | 5/1994 | Lee ........................................ 224/321 |
| 5,320,264 | 6/1994 | Weir ....................................... 224/321 |

FOREIGN PATENT DOCUMENTS 2111585 7/1983 United Kingdom ............. 403/DIG. 9

Primary Examiner—Henry J. Recla
Assistant Examiner—Gregory M. Vidovich
Attorney, Agent, or Firm—Brooks & Kushman P.C.

[57] ABSTRACT

The crossbar for an article carrier including a pair of side rails, each of the side rails having a lip, includes a bar having first and second ends for supporting the bar across the side rails. At least one of the ends includes a movable jaw and a fixed jaw, each jaw having a jaw surface engageable with the rail lip. The crossbar also includes a clamp for selectably urging the jaw surfaces against the rail, the clamp comprising a threaded stem carried by the movable jaw and extending through a slot in the fixed jaw. The movable jaw is movable in a plane parallel to the rail lip and between a position in registration with the lip surface and a retracted position out of registration with the lip. Preferably, an actuator wheel for the clamp is exposed for access and ease of manipulation but within the contour of adjacent luggage carrier surfaces.

13 Claims, 4 Drawing Sheets

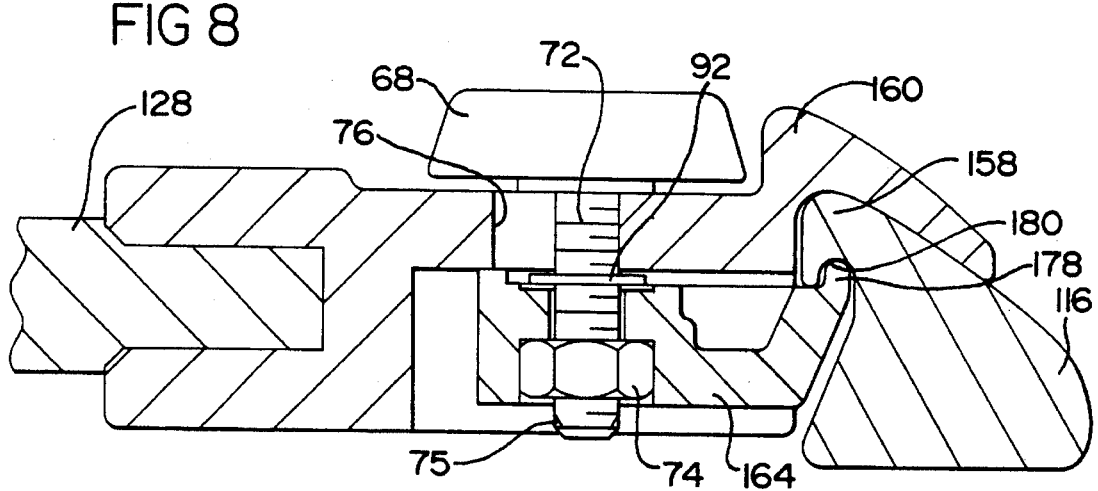
FIG 8
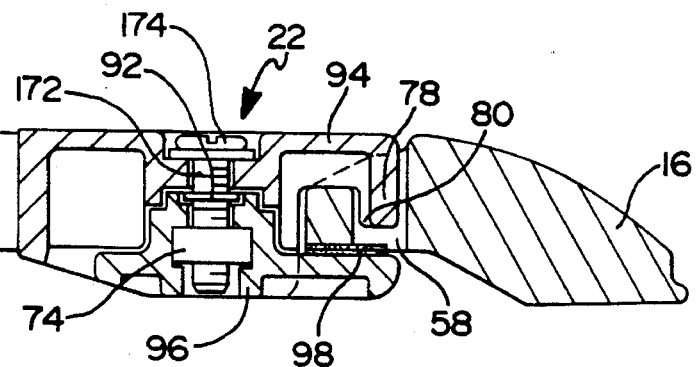
FIG 9
FIG 10 ly small

ARTICLE CARRIER CROSSBAR WITH SPLIT STANCHION CLAMP

TECHNICAL FIELD

The present invention relates generally to article carriers for mounting on motor vehicle panels, and more particularly to clamps used to secure the crossbar to a pair of spaced elongated rails mounted on the vehicle panel.

BACKGROUND ART

Many known article carriers for mounting to motor vehicle body panels include a pair of spaced side rails and crossbars supported or carried by the panel mounted rails. While many previous crossbars were mounted only at discrete positions along the side rail, fixed positioning of the rail limits the utility of the carrier. In particular, the luggage rack may not be adapted to fit particularly sized luggage or the like without remounting the rails to the vehicle panel.

Improvements permitting variation in the position of each crossbar with respect to the side rails are often difficult to operate. For example, U.S. Pat. No. 4,270,681 to Ingram discloses a luggage carrier adapted for sliding adjustment in a carrier track. The bracket is particularly shaped to fit within the restricted opening track. The restricted opening retains the bracket within the track along the length of the rail. Nevertheless, the locking mechanism for securing the bracket in a fixed position along the rail requires the use of a special tool. The tool not only has a special shape for fitting within an actuating member of the locking mechanism, but also requires a particular handle shape in order to reach the actuating member that is recessed within an opening at the bottom of the bracket.

U.S. Pat. Nos. 4,162,755 and 4,274,570 disclose luggage carriers in which a crossrail is supported by a pair of stanchions in U.S. Pat. No. 4,234,570, each stanchion includes a member that is captured within a track formed in a rail member. Moreover, while the locking mechanism is actuated by a turnable wheel, the wheel is exposed exteriorly of the sides of the stanchion so that it is accessible even though hidden below the top of the stanchion. As a result, the turnable wheel protrudes beyond the styling lines of the crossrail stanchion. U.S. Pat. No. 4,162,755 discloses a luggage carrier with a threaded stem carried by the turnable wheel and engageable in the threaded recess of a mounting plate secured by fastening or the like to the vehicle panel, and does not have an elongated track for changing the position of the crossrail on the vehicle panel.

U.S. Pat. No. 5,232,138 to Cucheran discloses bracket members supporting a crossbar laterally between and secured adjacent opposite ends to bracket members carried upon slats secured to the motor vehicle. The brackets disclose actuating means pivotable about a fixed pivot shaft and within the vertical plane extending through the restraining bar. The actuating means is carried within a recessed portion of the bracket member and is manually movable between the locked position where an outer surface is flush with the outer surface of the bracket. A locking means is responsive to the actuating means for raising a hook member in to tight engagement with the rail. The actuating means is extended outwardly beyond the outer surface of the bracket member when the locking means is disengaged. The hook member of the actuating means is separately constructed from the stanchion members and thus does not form a split stanchion clamp jaw that structurally enclose the rail within portions of the bracket.

An article carrier shown in U.S. Pat. No. 5,205,453 to Pudney et al. includes a crossbar support that employs a retractable lock pin selectively engageable in a plurality of longitudinally spaced apertures in a side rail. A pushbutton is exposed at the outer surface of the support member. While the support member has surfaces that mate with surfaces of the rail to support a load, the forces exerted against the rack during vehicle operation tending to separate the support member from the rail must be resisted by the retractable lock pin.

U.S. Pat. No. 4,487,348 discloses rail structure in which the side rails are provided with a lip engaged by a clamp on the crossrail. A first member of the cross rail clamp lays over a portion of the rail lip to support down loads imposed on the crossrail. A second member pivots at one end with respect to the first member to move the other end into and out of engagement with the lower surface of the rail lip. A threaded adjuster clamps the upper and lower members against the rail lip but is hidden beneath the rail, or reduced in size and recessed within the exposed exterior surface of one of the clamp members. Thus, the clamp actuator is constructed in a way tending to obscure access to the adjuster in order to avoid interference with styling.

SUMMARY OF THE PRESENT INVENTION

The present invention overcomes the above-mentioned disadvantages by providing the crossbar for an article carrier used in conjunction with side rails having a lip, the crossbar including an easily accessed and manipulated actuator for the clamp which releases a jaw for displacement away from the rail lip. The actuator is exposed above the clamp intermediate bosses on the jaw in a readily accessible and exposed area of the upper jaw for ease of operating the clamp, but without obscuring styling of the overall shape of the stanchion or crossbar end.

In the preferred embodiment, the crossbar includes a clamp and actuator as described above at one end of the crossbar, while the other end includes a slidably insertable retainer which may be inserted into a rail at an inclined position and lockingly engaged with the adjacent rail when the other end is pivoted down into engagement with the opposite rail. Preferably, the retainer is in the form of a T-shaped section which is insertable through an opening in the rail and becomes aligned behind retaining walls of the rail as the opposite end of the crossbar is moved to its installed position on the opposite rail.

In the preferred embodiment, the clamp includes a slidably movable jaw carrying a threaded stem engaged with a rotary wheel. The threaded stem passes through a slot in a fixed jaw so that threaded stem is displaceable along the slot within the fixed jaw. In this manner, the rotary wheel displaces the movable jaw into and out of registration with the lip of the side rail. In one version, the slot is elongated in the fixed jaw member and aligned so that the movable jaw is retractable from the lip in a direction substantially parallel to the adjacent lip surface registering with the movable jaw surface. Another form of the jaw structures according to the present invention enables the movable jaw to be rotated away from registration with the lip surface in a direction substantially parallel to the lip surface of the side rail. In addition, although it is preferable that at least one of the jaws includes a protrusion extending into a recess in the rail, the protrusion is most preferred in the upper fixed jaw so that the movable jaw can be displaced, in a direction substantially parallel to the rail lip surface, with only a relatively small number of turns of the threaded stem to release the movable jaw.

As a result, the present invention provides an easily operated luggage carrier which is rugged and can be selectively positioned along the length of the side rails forming a luggage carrier. The present invention provides the advantage that a simple clamping mechanism reduces the physical effort required to selectively clamp, position or remove the crossbar from the side rails of the luggage carrier. It is also an advantage of the present invention to provide an easily installable crossbar for luggage carriers in which one end of the crossbar may be lockingly engaged with a siderail by insertion of the crossbar at an inclined angle and realignment of the crossbar so that the opposite end engages the opposite rail. In addition, this advantage of the present invention provides a crossbar having only a single clamping mechanism on one end of the crossbar so that insertion and engagement of both ends of the crossbar can be accomplished from one side, preferably the road shoulder side, of the vehicle.

In addition, the present invention provides the advantage that the clamp for engaging the lip of a side rail includes a movable jaw as well as an actuator that is movable in the direction of the lip surface from a position in registration with the jaw surface to a retracted position spaced away and not in registration with the lip surface. In addition, the luggage carrier preferably includes a pair of removable crossbars having the insertably engageable ends and easily accessed clamps and clamp actuators for installation from a single side of the vehicle.

BRIEF DESCRIPTION OF THE DRAWINGS

The present invention will be better understood by reference to the following detailed description in which like reference characters refer to like parts throughout the views and in which:

FIG. 8 is an enlarged sectional view similar to FIG. 6 but showing modification of the clamp with a crossbar according to the present invention;

FIG. 9 is an enlarged sectional view similar to FIG. 6 but shown in further modification of the clamp mechanism according to the present invention; and FIG. 10 is a plan view showing movement of a displaceable jaw in the clamp shown in FIG. 9. It is noted that some parts have been removed for the sake of clarity.

DETAILED DESCRIPTION OF THE PREFERRED EMBODIMENT

Figure 1:
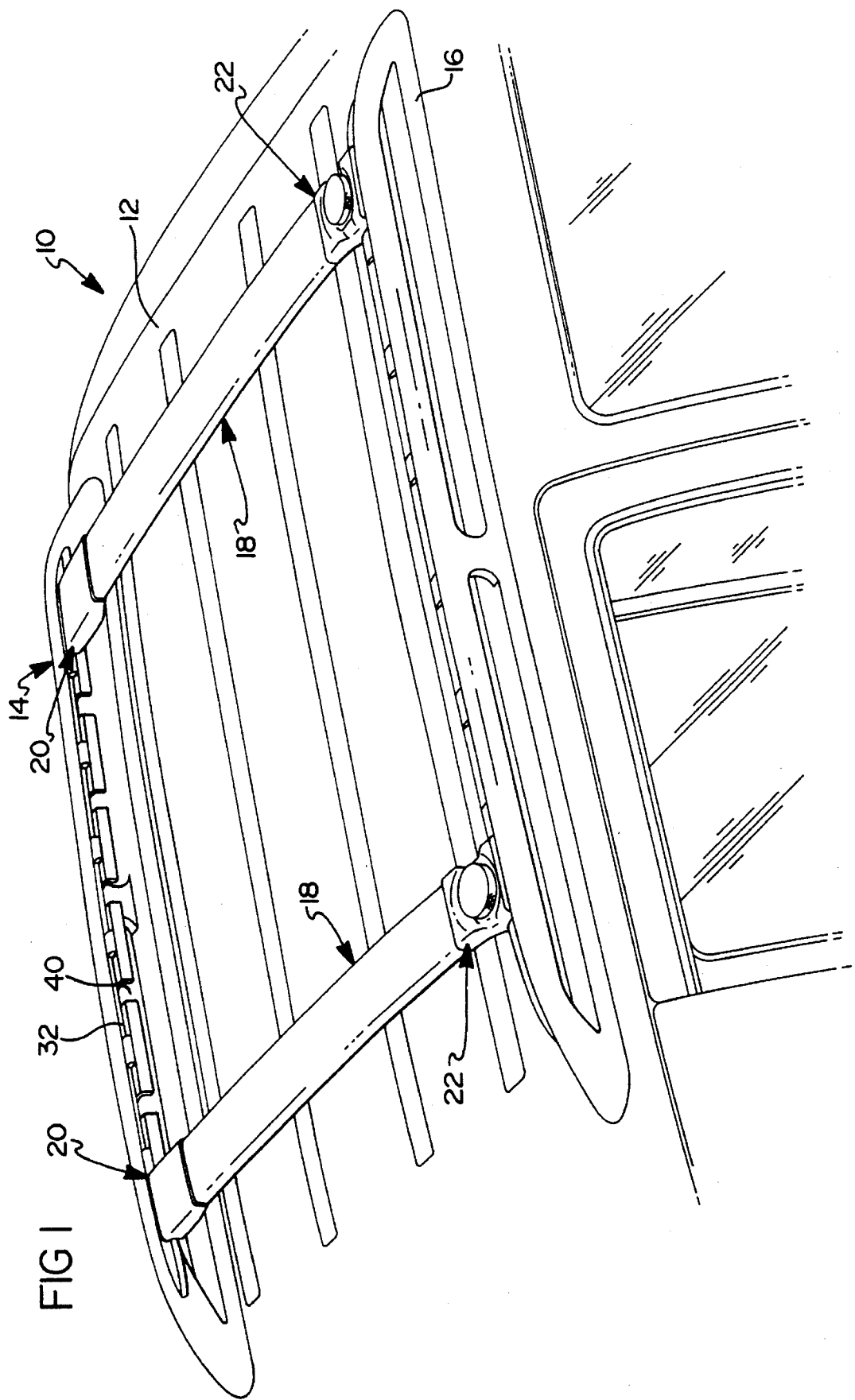
FIG. 1 is a perspective view of a luggage carrier mounted on a motor vehicle and constructed according to the present invention.

Referring first to FIG. 1, an article carrier 10 is thereshown rigidly secured to a motor vehicle roof panel 12 preferably by conventional fasteners. For example, usually, riv nuts are installed in the roof panel to receive bolts. The fasteners may be adaptable to various OEM fasteners such as internally threaded nuts that engage studs mounted to a plate welded on the vehicle panel. The carrier 10 includes left side rail 14 and right side rail 16 and the pair of crossbars 18 extending across the side rails 14 and 16. The crossbars 18 are selectively engageable with the rails 14 and 16 as will be described in greater detail hereinafter. In any event, a left end 20 of each crossbar 18 and right end 22 of each crossbar 18 retain the crossbar in a fixed position with respect to the side rails 14 and 16 as will also be discussed in detail below.

Each of the crossbars 18 may be modified as desired, for example, to include two ends 22 for fixedly securing the ends of the crossbars 18 to the side rails 14 and 16. As a further example, the ends may be constructed as stanchions that raise the crossbars above the side rails. Moreover, it will be understood that the side rails 14 and 16 of each pair may be modified by styling differences, or may be constructed in the same manner as required for engagement of like ends 22 or the differing ends 20 and 22 applied to the crossbars 18, as will be apparent from the examples described in detail.

Figure 2:
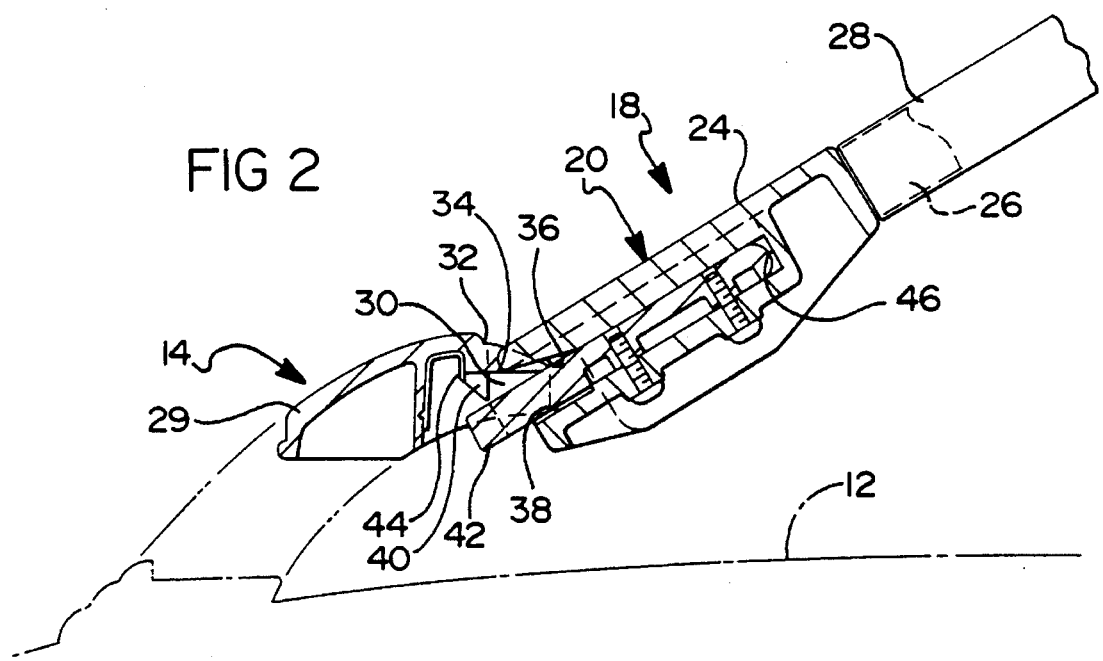
FIG. 2 is a cross-sectional view of a portion of the luggage carrier shown in FIG. 1 and demonstrating an inclined insertion position of one end of the crossbar according to the present invention.

Referring now to FIG. 2, the end 20 comprises a jaw body 24 and a projecting end portion 26 fitting within a tubular cross rail 28. As previously mentioned, the jaw body 24 may be in the form of a stanchion which raises the rail 28 above the side rail 14. As shown in the preferred embodiment, the rail includes a raised portion 29 that supports the rail lip 30 at a raised position above the body panel 12. The lip 30 extends laterally with a socket 32 formed in the upper surface of the rail 14 to provide a fixed crossbar position on the rail. A jaw receiving surface 34 of the rail 14 is engageable against an inclined slide jaw surface 36 on the jaw body 24 of the crossbar 18. A lower jaw surface 38 in the jaw body 24 clears the lower edge of the lip 30 when the crossbar 18 and end 20 are inclined upwardly to the right as shown in FIG. 2. The slide surfaces 36 and 38 define a recess in the jaw body 24 adapted to receive the lip 30.

In addition, side rail 14 includes a slot 40 near the socket 32 adapted to receive a projection 42 carried by the end 20. In the preferred embodiment, the projection 42 is T-shaped so that the stem fits within the slot 40 in the rail 14, and the transverse portion 43 of the T-shaped projection 42 extends behind the retaining wall 44 at outboard recess 45 on the rail 14. In the preferred embodiment, the projection 42 is separately fabricated for installation in a recess 46 within the jaw body 24 for ease in manufacturing the interlocking end 20 of crossbar 18.

Figure 3:
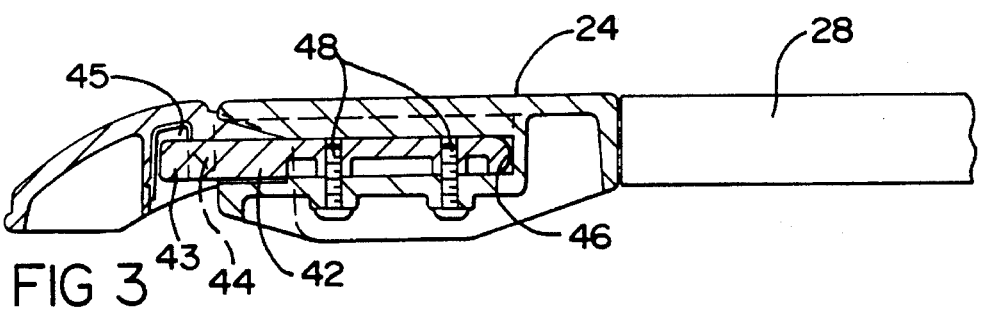
FIG. 3 is a sectional view similar to FIG. 2 but showing the crossbar in an installed alignment position according to the present invention.
Figure 4:
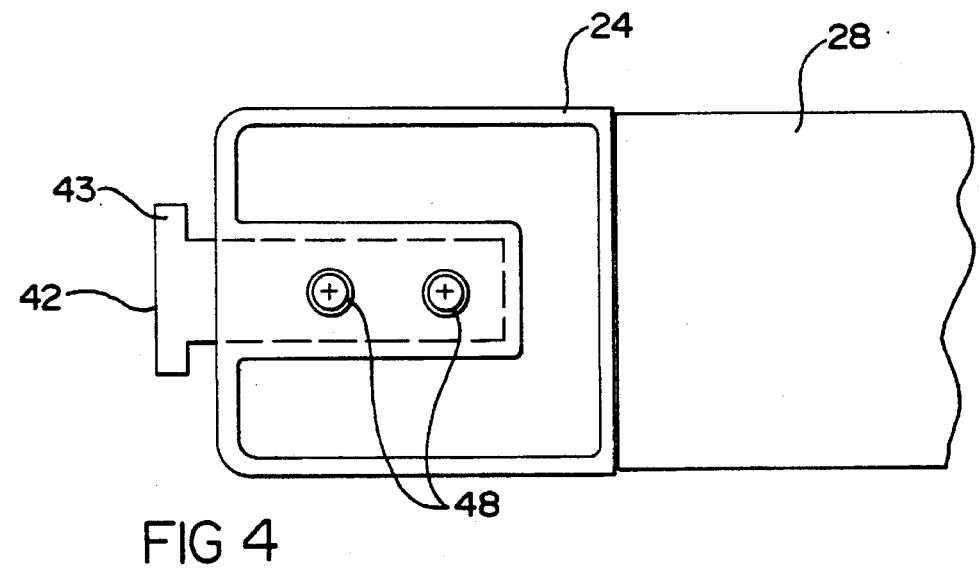
FIG. 4 is a top plan view of a portion of the crossbar shown in FIG. 3.

As the end 20 is inclined so that the surface 36 engages the upper surface of the lip 30, projection 42 bypasses the retaining wall 44 and the lower slide surface 38 extends past the lip 30. As the crossbar 18 is then aligned to a more horizontal position as shown in FIG. 3, the transverse portion 43 of the T-shaped projection 42 becomes retained behind the wall 44 and a portion of the lip 30 supports the slide surface 36. The slide surface 38 prevents upward disengagement of the crossbar 18 from the rail 14. As a result, the crossbar 18 is locked in position laterally as well as vertically and along the direction of the length of the side rail. Nevertheless, in the position shown in FIG. 2, the crossbar may be aligned at any selected socket 32 position along the side rail at which the lip 30 may be received in the recess 46.

Figure 5:
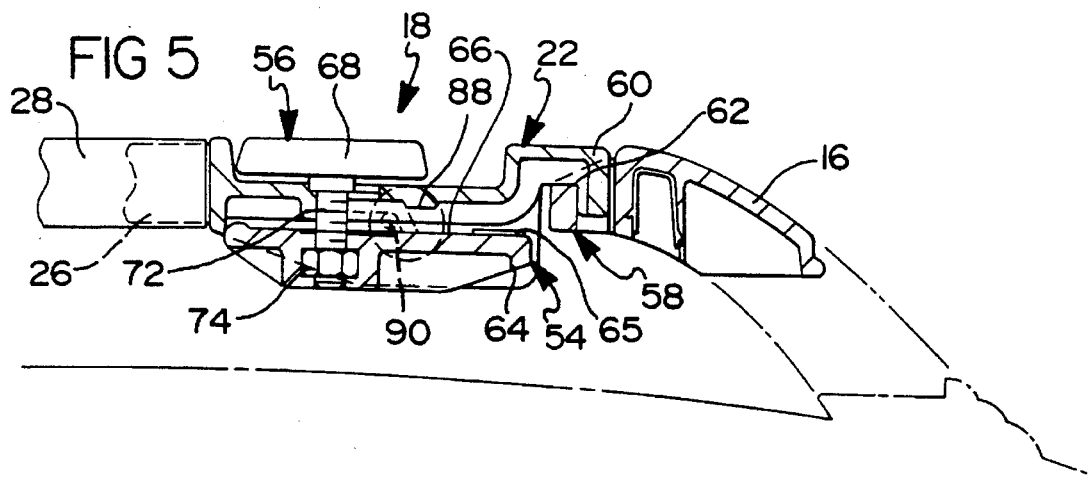
FIG. 5 is an enlarged sectional view of the other end of the crossbar shown in FIG. 1 in an installing position according to the present invention.
Figure 6:
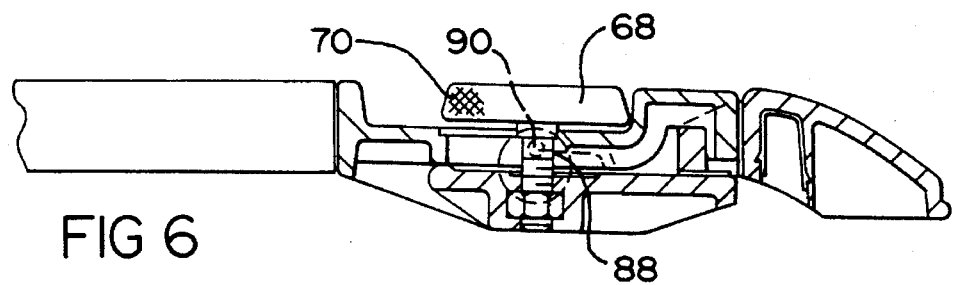
FIG. 6 is a sectional view similar to FIG. 5 but showing the crossbar in a clamped position according to the present invention.
Figure 7:
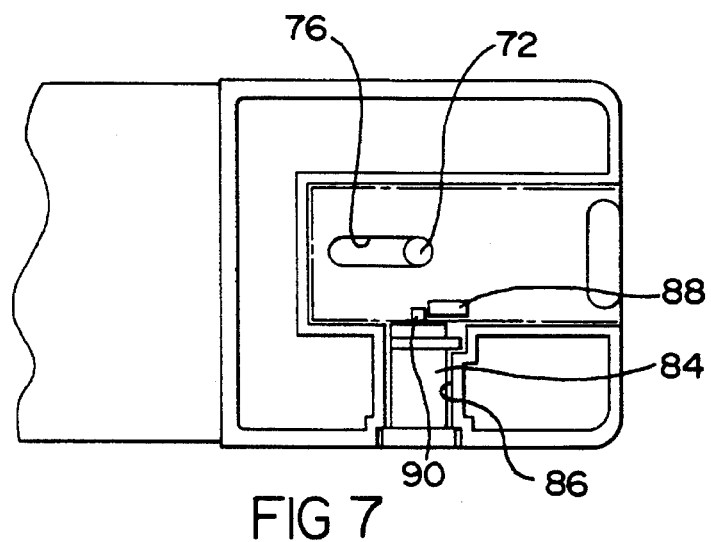
FIG. 7 is a top plan view of a portion of the device shown in FIG. 6.

Referring now to FIGS. 5–7, the other end 22 of crossbar 18 comprises a clamp 54 combined with an actuator 56 for locking the end 22 with the lip 58 of the rail 16. Like the end 20, the end 22 has a projection 26 that fits within tubular rail 28 of the crossbar 18, for example, a projection from the fixed jaw body 60. The jaw body has a fixed jaw surface 62 that matingly engages a surface of the lip 58. A movable jaw 64 includes jaw surface 66 adapted to register with the lower surface of the lip 58.

The actuator 56 for the clamp 54 comprises an enlarged rotary wheel 68 that can be grasped by a user's hand. Preferably, this wheel includes a peripheral, gripping surface such as a knurled surface. The wheel 68 is secured at the end of a threaded stem 72 carried by a nut within the movable jaw 64. For example, the jaw 64 may have an opening adapted to receive an octagonal nut, inserted in an opening transverse to the threaded opening receiving the threaded stem 72. Once the threaded stem 72 has been threadably engaged in the nut 74, the end of the threaded stem 72 may be swaged or otherwise deformed, or provided with a nylok fastener or the like, to retain the nut 74 and the threaded stem 72. As a result, the movable jaw 64 is urged against the fixed jaw 60 as the thumb wheel 68 is rotated.

In addition, the fixed jaw 60 includes an elongated slot 76 that permits sliding displacement of the stem carried by movable jaw 64. The jaw 64 slides with respect to the fixed jaw 60 in substantially the same direction as the lower surface of the lip 58. In addition, the fixed jaw 60 includes a projection 78 adapted to be received in a recess in the upper surface of the lip 58. The jaw 60 also has bosses that define a recess adapted to receive the wheel 68 so that the outer surface of the thumb wheel remains flush with the outer surface of the bosses on jaw 60, the rail 16 and the rail portion 28 of the crossbar 18.

As shown in FIG. 7, the end 22 may also include a lock for restricting movement of the jaw 64. In particular, the jaw 60 may carry a lock cylinder 84 rotatably engaged in a socket 86 in the jaw 60. The movable jaw 64 includes a projection 88 that interferes with the axial, eccentric projection 90 on the lock cylinder 84. When the cylinder 84 has been rotated to position the projection 90 in an interfering slide position with respect to the projection 88 on jaws 64, as shown in hidden line in FIG. 6, movement of the projection 88 is obstructed by the pin 90. This obstruction prevents displacement of the movable jaw 64 in the direction away from registration with the lip 58. As a result, even though the jaw 64 might be lowered by rotation of the wheel 68 and separated from the fixed jaw 60, the lock cylinder 84 restricts movement of the lower jaw 64 toward the position shown in FIG. 5. The rotary lock cylinder 84 limits removal.

Referring now to FIG. 8, a rail 116 has a lip 158 with a recess 180 in its lower surface. Accordingly, the movable lower jaw member 164 includes a projection 178 that interlocks the movable jaw 164 with the recess under the lip of the rail 116. Such an arrangement requires greater separation of the movable jaw 164 from the fixed jaw 160, but the additional turns of the wheel 68 and threaded stem permit the thread pitch to be fine to reduce effort required by the user. As shown, the smoother outer surface of the rail 116 protects the recess under the lip from obstruction by debris, snow and the like. As also shown in detail in FIG. 8, the upper fixed jaw member 160 may be adapted to receive the top rail member 128 within a recess formed in the boss of upper jaw member 160. In addition, swage 75 locks the nut 74 to prevent removal of the nut from the stem. The nut 74 is laterally received in the side-opening recess of movable jaw 164 to prevent axial separation of the nut 74 from movable jaw 164. The snap ring 92 locks the stem 72 in position in the jaw 160 in between the snap ring 92 and the thumb wheel 68 so that rotation of the stem 72 forces the nut 74 and thus the movable jaw 164 to move along the threaded stem 72.

Referring now to FIGS. 9 and 10, a modification of the end 22 is shown comprising a fixed jaw 94 and a movable jaw 96. Like the version shown in FIGS. 5–7, the fixed jaw 94 includes a projection 78 adapted to be received in a recess 80 in a lip 58. Moreover, while the movable jaw 96, like the movable jaw 164, has a flat surface for registration with the lower surface of the lip 58, the jaw surface 98 of the movable jaw 96 is displaced in a direction substantially parallel to the lower surface of the lip 58 by rotational movement.

In the preferred form of this embodiment, the threaded stem 172 is carried in the nut 74, and the nut 74 is retained on the stem by staking, swage or the like. Furthermore, the stem is retained in position on upper member 94 by snap ring 92. As the nut lowers and engages the staking, swage or the like, the movable jaw 96 rotates about the axis of the threaded stem away from registration with the lower surface of the lip 58 to the position shown in phantom line in FIG. 10. Moreover, the threaded stem 172 carries an enlarged head 174 adapted to receive a fastener tool, such as the flat head screwdriver, to limit access to removal of the crossbar 18 from the rail 16.

As a result, it will be understood that crossbar 18 shown in the preferred embodiment of the present invention is easily attached to the side rails mounted on vehicle body panel. In particular, the end 20 is inclined as shown in FIG. 2 and positioned for engagement at one of the sockets 32 and entry of the projection 42 in the slot 40. Then, with the lower jaw member 64 in the position shown in FIG. 5, or the jaw member 96 shown in the position in phantom line in FIG. 10 at which position shoulder 101 engages stop 99, the end 22 of the crossbar 18 is lowered into engagement with the rail 16. Accordingly, the lower jaw 64 is then slid along the slot 76 to the position shown in FIG. 6 or the jaw 96 is rotated to the position shown in solid line in FIG. 10 to engage the shoulder 103 against stop 99, placing the jaw surface 65 or jaw surface 98 in registration with the lower surface of the lip 58 by movement substantially in the direction of the plane of the lower surface of the lip 58. The lower jaw is then slid or rotated into a position in registration with the lower surface of the lip and the threaded stem is tightened to engage the fixed jaw and the movable jaw against opposite surfaces of the rail lip. When the optional locking cylinder 84 is provided in conjunction with the clamp 54, the crossbar 18 may be maintained in its attached position on the rails 14 and 16 until the cylinder is rotated to remove the projection 90 from its obstructing position with respect to the sliding projection 88 on the movable jaw.

Having thus described the present invention, many modifications thereto will become apparent to those skilled in the art to which it pertains without departing from the scope and spirit of the present invention as defined in the appended claims.

What is claimed is:

1. A crossbar for an article carrier including a pair of side rails, wherein each of said side rails includes a lip, said crossbar comprising:

a bar having first and second ends for supporting the bar to extend across the pair of side rails; and at least one of said ends comprising a clamp having a movable jaw and a fixed jaw wherein each said jaw has a jaw surface engageable with one of the rail lips;

said clamp having a threaded stem carried by said movable jaw and extending through said fixed jaw, whereby said movable jaw is movable in a plane substantially parallel to an adjacent surface of the one rail lip, said clamp supporting said movable jaw between a first position where said movable jaw surface is in registration with said adjacent surface on the one lip when said fixed jaw surface is in registration with the one lip and a second position in said plane where said movable jaw surface is not in registration with the one lip when said fixed jaw member is in registration with the one lip, wherein said movable jaw pivots in a plane generally parallel to the lip, wherein said clamp includes a stop restricting rotation of said movable jaw at said first and second positions.

2. The crossbar as defined in claim 1 wherein at least one of said first and second ends includes a recess formed to receive one of said lips and a retainer for holding the crossbar therein with the associated lip retained in the recess.

3. The crossbar as defined in claim 2 wherein said recess is dimensioned to receive the associated lip at an angle as the crossbar is inclined, said retainer comprising an arm with a locking flange that engages the associated rail as said bar pivots about the associated lip.

4. The crossbar as defined in claim 1 wherein both of said ends each have one said clamp.

5. An article carrier for a motor vehicle body panel comprises:

a pair of side rails including mounts for securing the rails in spaced alignment on the body panel wherein each of said side rails includes a lip;

at least one crossbar having first and second ends for supporting the crossbar to extend across said pair of side rails;

at least one of said ends having a clamp including a movable jaw and a fixed jaw, wherein each jaw has a jaw surface engageable with one of the rail lips;

said clamp having a threaded stem carried by said movable jaw and extending through said fixed jaw, whereby said movable jaw is movable in a direction parallel to a surface on said one rail lip between a first position where said movable jaw surface is in registration with said one lip when said fixed jaw surface is in registration with said one lip and a second position in said direction where said movable jaw surface is not in registration with said one lip when said fixed jaw member is in registration with said one lip;

wherein said one lip includes a socket formed on an upper surface of the associated rail to provide a fixed crossbar position on said associated rail and said crossbar clamp includes at least one of said jaw surfaces dimensioned to be received within said socket in said one lip in said fixed crossbar position thereby preventing movement of said at least one crossbar along the length of the associated rail.

6. The article carrier as defined in claim 5 wherein the first end of said at least one crossbar includes said clamp and the second end includes a recess formed to receive the lip of said lip of the other rail and a retainer for holding said lip of the other rail in said recess.

7. The article carrier as defined in claim 6 wherein said recess is dimensioned to receive the lip of the other rail at an angle as the at least one crossbar is inclined, said retainer comprising an arm with a locking flange that engages the other rail as said at least one crossbar pivots about the lip of the other rail from said angle.

8. The article carrier as defined in claim 5 wherein said fixed jaw includes an elongated slot and said first and second positions of said movable jaw are along said slot.

9. The article carrier as defined in claim 5 wherein said movable jaw rotates in a plane generally parallel to the surface on said one rail lip.

10. The crossbar as defined in claim 5 wherein said one lip includes a recess near said socket, and said clamp includes a jaw projection dimensioned to be received in said recess.

11. The crossbar as defined in claim 10 wherein said projection is said fixed jaw.

12. A luggage carrier comprising:

a pair of side rails, each side rail having a lateral rail lip;

at least one crossbar having a first end and a second end;

said first end having a slidably receivable retainer with a recess dimensioned to receive therein said lip therein at an inclined angle, and said retainer further including an arm with a locking flange receivable under said one lip in said inclined position and fixed with respect to said one lip in a lowered position thereby preventing movement of said at least one crossbar along the length of the associated rail;

said second end having a clamp including a fixed jaw and a movable jaw, each jaw having a jaw surface engageable with said lip of the other rail;

said clamp comprising an actuator, and a threaded stem carried by said movable jaw and extending through said fixed jaw, whereby said movable jaw is movable in a direction substantially parallel to said rail lip of said other rail between a first position in said direction where said movable jaw surface is in registration with said lip of said other rail when said fixed jaw surface is in registration with said lip of said other rail, and a second position in said direction where said movable jaw surface is not in registration with said lip of said other rail when said fixed jaw member is in registration with said lip of the other rail.

13. An article carrier for a motor vehicle body panel comprises:

a pair of rails including mounts for securing the rails in spaced alignment on the body panel, each rail having a lip and having a laterally adjacent portion outboard of said lip, at least one socket in each said lip, and a recess in said laterally adjacent portion outboard of each said lip;

at least one crossbar having first and second ends for supporting the crossbar to extend across said rails;

each of said ends having an upper jaw surface and a lower jaw surface, wherein each jaw surface is engageable with the respective rail lips;

at least one end having a clamp for supporting and selectively urging said jaw surfaces at that end against one said rail lip, said clamp comprising an actuator, and a threaded stem carried by said movable jaw and extending through said fixed jaw, whereby said movable jaw is movable in a direction parallel to said one rail lip between a first position in said direction where said movable jaw surface is in registration with said one lip when said fixed jaw surface is in registration with said one lip, and a second position in said direction where said movable jaw surface is not in registration with said one lip when said fixed jaw member is in registration with said one lip; and at least one of said ends having one of said jaw surfaces engaging said socket in the associated lip and the other of said jaw surfaces having a projection dimensioned and received within said outboard recess of the associated lip thereby preventing longitudinal movement of said at least one crossbar along the length of the associated rail.

* * * * *